United States Patent
Neu et al.

(10) Patent No.: US 10,351,343 B2
(45) Date of Patent: Jul. 16, 2019

(54) SHUTTLE WAREHOUSE

(71) Applicant: BITO-Lagertechnik Bittmann GmbH, Meisenheim (DE)

(72) Inventors: Sascha Neu, Altenglan (DE); Helmut Sponheimer, Kirn (DE)

(73) Assignee: BITO-LAGERTECHNIK BITTMANN GMBH, Meisenheim (DE)

( * ) Notice: Subject to any disclaimer, the term of this patent is extended or adjusted under 35 U.S.C. 154(b) by 0 days.

(21) Appl. No.: 15/806,124

(22) Filed: Nov. 7, 2017

(65) Prior Publication Data

US 2018/0127207 A1 May 10, 2018

(30) Foreign Application Priority Data

Nov. 10, 2016 (DE) .................... 20 2016 106 276 U (51) Int. Cl.
*B65G 1/02* (2006.01)
*B65G 1/04* (2006.01)

(52) U.S. Cl.
CPC .............. *B65G 1/023* (2013.01); *B65G 1/02* (2013.01); *B65G 1/04* (2013.01)

(58) Field of Classification Search
CPC . B65G 1/026; B65G 1/06; B65G 1/08; B65G 1/023; B65G 1/02; B65G 1/04; F16B 37/068; F16B 37/065
USPC ......... 211/151, 191, 192; 411/107, 180, 399
See application file for complete search history.

(56) References Cited

U.S. PATENT DOCUMENTS

| | | | | |
|---|---|---|---|---|
| 1,563,116 A | * | 11/1925 | Tinsley | A47F 1/126 211/151 |
| 2,786,578 A | * | 3/1957 | De Graaf | B65G 1/023 193/35 R |
| 2,891,677 A | * | 6/1959 | Ritchie | A47F 1/12 193/35 R |
| 2,950,014 A | * | 8/1960 | Sullivan | B65G 1/023 211/151 |
| 2,969,863 A | * | 1/1961 | Woldring | B65G 1/023 193/35 R |

(Continued)

FOREIGN PATENT DOCUMENTS

| | | |
|---|---|---|
| DE | 4010598 A1 | 10/1990 |
| DE | 10 2010 029 563 B4 | 12/2012 |

(Continued)

OTHER PUBLICATIONS

Extended European Search Report issued in corresponding European Application No. 17197667.3 dated Mar. 19, 2018.

*Primary Examiner* — Jennifer E. Novosad
(74) *Attorney, Agent, or Firm* — J. Clinton Wimbish; Nexsen Pruet, PLLC (57) ABSTRACT

A shuttle warehouse for storing load carriers comprises a framework and a gangway, the framework having guide rails designed to guide the movement of a distribution vehicle, designed to physically move the load carriers, in the gangway on a bearing surface of the guide rails. The guide rails are each formed by segments arranged in succession in the longitudinal direction of the guide rails, and the segments are fixed to the framework by press-fit threaded bolts resulting in the upper face of the heads of the press-fit threaded bolts being received in the segments flush with the bearing surface.

8 Claims, 5 Drawing Sheets

(56) References Cited

U.S. PATENT DOCUMENTS

| | | | | |
|---|---|---|---|---|
| 3,399,784 | A * | 9/1968 | Buchbinder | A47F 5/0093 |
| | | | | 211/151 |
| 3,792,933 | A * | 2/1974 | Stencel | B21J 15/022 |
| | | | | 29/243.522 |
| 3,900,112 | A * | 8/1975 | Azzi | B65G 1/023 |
| | | | | 193/35 R |
| 4,116,343 | A * | 9/1978 | Hall | B65G 1/10 |
| | | | | 211/151 |
| 4,168,780 | A * | 9/1979 | Parrott | B65G 1/023 |
| | | | | 193/35 R |
| 4,372,451 | A * | 2/1983 | Rasmussen | B65G 1/023 |
| | | | | 211/151 |
| 4,453,641 | A * | 6/1984 | Rasmussen | A47F 1/12 |
| | | | | 211/151 |
| 4,687,404 | A * | 8/1987 | Seiz | B65G 1/06 |
| | | | | 211/151 |
| 4,771,901 | A * | 9/1988 | Griswold | B65G 1/06 |
| | | | | 16/18 R |
| 4,955,489 | A * | 9/1990 | Allen | B65G 1/026 |
| | | | | 211/151 |
| 4,982,851 | A * | 1/1991 | Konstant | B65G 1/026 |
| | | | | 211/151 |
| 4,998,184 | A * | 3/1991 | Honig | B60Q 1/0683 |
| | | | | 362/284 |
| 5,137,159 | A * | 8/1992 | Collins | B65G 1/026 |
| | | | | 211/151 |
| 5,256,019 | A | 10/1993 | Phillips, II | |
| 5,692,817 | A * | 12/1997 | Jun | A47B 46/00 |
| | | | | 211/151 |
| 6,003,882 | A * | 12/1999 | Colonese, Jr. | A63C 17/06 |
| | | | | 280/11.19 |
| 6,138,372 | A * | 10/2000 | Newman | B23Q 9/005 |
| | | | | 144/144.1 |
| 6,726,039 | B2 * | 4/2004 | Boron | A47F 3/06 |
| | | | | 108/107 |
| 9,326,600 | B1 * | 5/2016 | Reynolds | A47B 47/00 |
| 2002/0139766 | A1 * | 10/2002 | Courtwright | B65G 1/026 |
| | | | | 211/191 |
| 2002/0179555 | A1 * | 12/2002 | Pater | B65G 1/02 |
| | | | | 211/151 |
| 2004/0112851 | A1 * | 6/2004 | Gorniak | B65G 1/026 |
| | | | | 211/151 |
| 2005/0051505 | A1 * | 3/2005 | Lewis | B65G 1/06 |
| | | | | 211/151 |
| 2005/0082246 | A1 * | 4/2005 | Krummell, Jr. | A47F 10/04 |
| | | | | 211/151 |
| 2007/0295682 | A1 * | 12/2007 | Konstant | B65G 1/026 |
| | | | | 211/151 |
| 2011/0052302 | A1 * | 3/2011 | Kayser | B41J 11/0025 |
| | | | | 400/642 |
| 2012/0074088 | A1 * | 3/2012 | Dotson | B65G 1/023 |
| | | | | 211/151 |
| 2012/0152875 | A1 * | 6/2012 | Krummell | B65G 1/026 |
| | | | | 211/151 |
| 2013/0039715 | A1 * | 2/2013 | Daykin | F16B 13/0833 |
| | | | | 411/21 |
| 2018/0127207 | A1 * | 5/2018 | Neu | B65G 1/023 |

FOREIGN PATENT DOCUMENTS

| | | |
|---|---|---|
| DE | 10 2014 114 496 A1 | 4/2016 |
| GB | 2515097 A | 12/2014 |

* cited by examiner

SHUTTLE WAREHOUSE

RELATED APPLICATION DATA

The present application claims priority pursuant to 35 U.S.C. § 119(a) to German Patent Application Number 20 2016 106 276.4 filed Nov. 10, 2016 which is hereby incorporated by reference in its entirety.

The invention relates to a shuttle warehouse.

Various devices by means of which piece goods can be stored, for example arranged on pallets, are known from the prior art. For example, DE 38 40 648 A1 describes an in/out high-bay storage device having a plurality of rack gangways in one plane with a plurality of planes, arranged one above the other, of gangways with associated conveying equipment. A further gangway storage system as a special case of a shuttle warehouse is known from DE 10 2010 029 563 B4.

Shuttle warehouses are generally high-bay stores for piece goods, in which multiple storage units can be stored in individual gangways either one behind the other or to the side of the gangways. So as to then enable piece goods to be moved, placed in storage or removed from storage, a handling unit in the form of a distribution vehicle is used, which is also referred to as a shuttle, gangway vehicle or satellite vehicle. The distribution vehicle is designed to drive under and lift load carriers and to move them within the gangway in the raised state. Goods can thus be placed in storage and removed from storage by moving the charge carriers in the gangway. In the case in which the load carriers are mounted to the side of the gangways, the distribution vehicle has corresponding means to lift the load carriers, move them from the lateral storage positions into the gangway and then move them within the gangway in the raised state.

SUMMARY

By contrast, the object of the invention is to provide an improved shuttle warehouse.

The object underlying the invention is achieved by the features of the independent claim. Preferred embodiments of the invention are described in the dependent claims.

A shuttle warehouse for storing load carriers is described, wherein the shuttle warehouse has a framework and a gangway, wherein the framework has guide rails, wherein the guide rails are designed to guide the movement of a distribution vehicle, designed to physically move the load carriers, in the gangway on a bearing surface of the guide rails, wherein the guide rails are each formed by segments arranged in succession in the longitudinal direction of the guide rails, wherein the segments are fixed to the framework by press-fit threaded bolts, wherein the fixing results in the upper face of the heads of the press-fit threaded bolts being received in the segments flush with the bearing surface and in the press-fit threaded bolts being screwed to the framework by means of the thread. In other words, the guide rails guide the movement of the distribution vehicle on the bearing surface.

For example, the shuttle warehouse comprises at least one gangway with at least a first and a second level, wherein the first level as defined by the bearing surface and the second level is used for the storage of load carriers.

The term "load carriers" is to be understood for example to mean pallets or a wide range of types of devices capable of receiving or supporting desired piece goods which are to be stored.

Embodiments of the invention could have the advantage that a development of noise as the vehicle traverses the points at which the segments are fixed to the framework is minimised. The invention has surprisingly found that a source of the noise produced during operation of a shuttle warehouse derives from the fact that the wheels of the distribution vehicle as it traverses the fastening points causes impact noises even with the slightest unevenness at these points. Since the upper face of the heads of the press-fit threaded bolts is now received in the segments flush with the bearing surface, there are no parts of the guide rails which are disposed outside the bearing surface and which thus constitute unevennesses—whether indentations or elevations.

Due to the fact that there are no unevennesses present in the region of the bearing surface, any vibrations of the distribution vehicle as it traverses the fastening points are also minimised or even avoided. This could then be relevant if the piece good could react sensitively to vibrations. Sensitive piece goods, here, could be certain chemicals or electronic components.

It should be mentioned that straight press-fit threaded bolts therefore could be advantageous, since these deform naturally as they are pressed into the associated holes of the segments, so that the upper face of the heads of the press-fit threaded bolts is automatically received in the segments flush with the bearing surface. With the alternative use for example of countersunk-head screws, this flushness is not provided, since these screws have manufacturing tolerances, and therefore the head upper face for example sometimes protrudes from the bearing surface of the segments depending on the tolerance and other times is itself disposed in the segments below the bearing surface.

The use of press-fit threaded bolts could also have the advantage that the holes in the segments provided to receive the press-fit threaded bolts can be manufactured with greater tolerances, without detriment in respect of said development of noise. In all cases, the press-fit threaded bolts are pressed into the provided holes of the segments until the upper face of the heads of the press-fit threaded bolts is received in the segments flush with the bearing surface. For this purpose, the tool used to press in the bolts can have a ram for example, wherein the press-fit threaded bolts are pressed by means of the ram into the provided recesses of the segments. Here, as considered in the plane of the bearing surface, the ram laterally overlaps the head of the bolt to be pressed in, and the segment automatically forms a stop during the press-fit process, which stop limits the movement of the ram in the direction of the bearing surface. It is thus ensured that the upper face of the head of the press-fit threaded bolt is received in the corresponding segment exactly flush with the bearing surface.

In accordance with one embodiment of the invention the heads of the press-fit threaded bolts are received fully in countersinks of the segments. For example, the countersinks have a conical depression and the heads of the press-fit threaded bolts have a frusto-conical shape which mates with the conical depression. The use of countersinks could have the advantage that a self-centring of the bolts is thus ensured. The press-fit process could also be simplified since the material perpendicular to the press-fit direction, i.e. with respect to the cylinder-symmetrical press-fit threaded bolts, is displaced radially inwardly on account of the funnel effect of the cone shape as the bolt is pressed in. It is thus made easier for the material of the bolt to adopt the desired shape in the head region with minimal application of force.

In accordance with one embodiment of the invention the countersinks have a slot shape, wherein the longitudinal axis of the slot extends in the running direction of the guide rails, wherein the countersinks, as considered in a plane perpendicular to the running direction, have walls running at an incline, and the heads of the press-fit threaded bolts, as considered in this plane, bear fully against the walls.

This could have the advantage that the process of pressing the bolt into the segment is further mechanically simplified, since, on account of the slot shape as considered in the running direction, there is always sufficient space for the part of the material of the head that is deformed within the segment as the bolt is pressed in and is deformed in or against the running direction. Furthermore, on account of the walls running at an incline, a self-centring of the press-fit threaded bolt takes place in the direction as considered perpendicular to the running direction and perpendicular to the axis of the cylindrical press-fit threaded bolt.

In accordance with one embodiment of the invention the press-fit threaded bolts are screwed to the framework in a frictionally engaged manner by nuts engaging in the threads. For example, it is thus possible to later release the segments from the framework and in particular replace individual segments. This could be necessary for example if one of the segments is damaged.

In accordance with one embodiment of the invention the surfaces of the heads as considered in the plane parallel to the bearing surface are contour-less. Due to the smooth surfaces of the heads, the heads themselves form part of the bearing surface without a resistance, which for example could result from a partial indentation of the surfaces. As the heads are traversed by the distribution vehicle, there is no difference for the wheels of the distribution vehicle used for this purpose in respect of the contact between the normal bearing surface and the contact with the surface of the heads. Since the surface of the heads and of the bearing surface is therefore identical, as "felt" by the wheels, a development of noise as the heads are traversed is avoided.

In accordance with one embodiment of the invention the bearing surfaces of the segments are arranged adjacently to the surfaces of the heads without gaps, as considered in the plane of the bearing surface. Due to the "seamless" transition between bolts and bearing surface on account of the lack of a gap between the bearing surface and heads of the bolts, a further source for the development of noise as the heads are traversed by the distribution vehicle could be omitted here as well. With regard to the surface contour, the bearing surface and the surface of the heads form a single uninterrupted level, on which the distribution vehicle can travel.

Preferred embodiments of the invention will be explained in greater detail hereinafter with reference to the drawings, in which.

Hereinafter, similar elements will be denoted by like reference signs.

DETAILED DESCRIPTION

Figure 1:
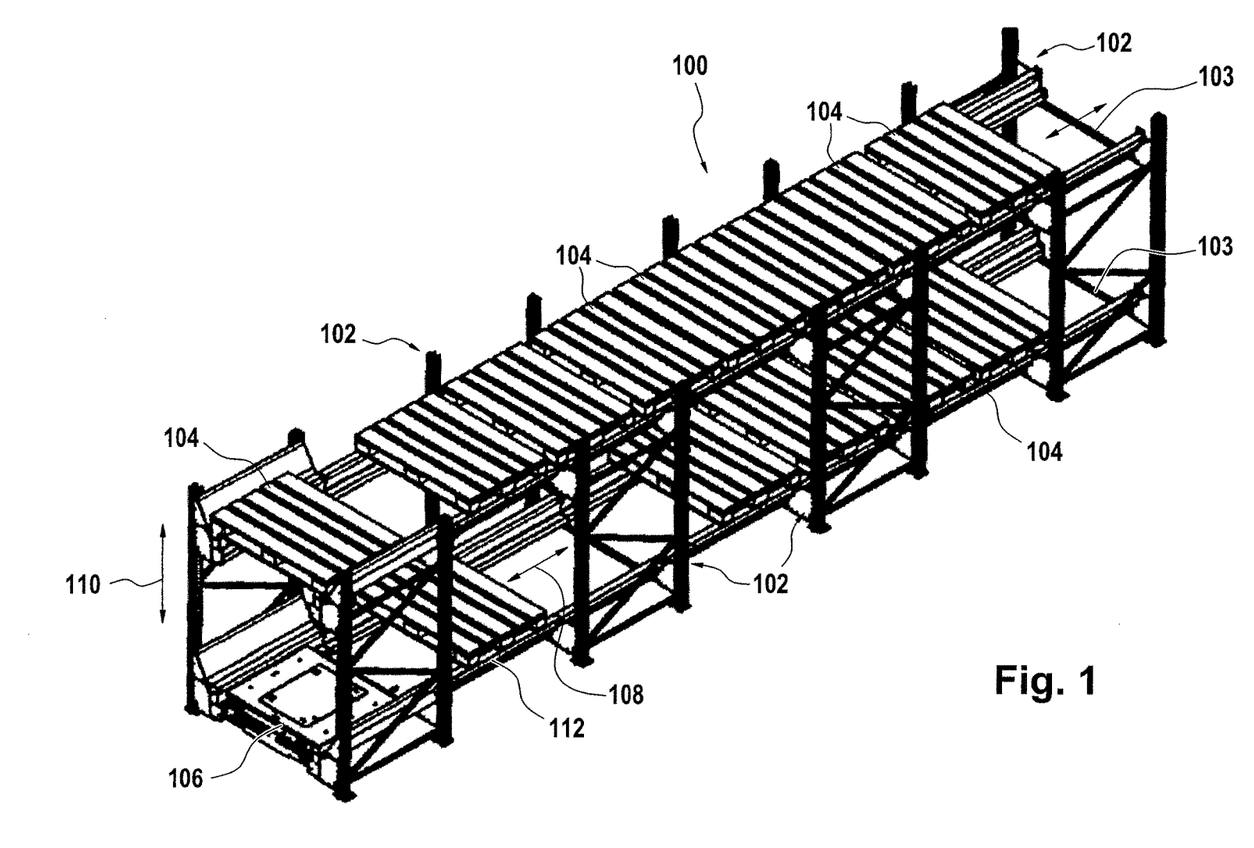
FIG. 1 shows a schematic perspective illustration of a shuttle warehouse.

FIG. 1 shows a gangway storage system as a special case of a shuttle warehouse 100 with a single gangway with a first and second level not shown in greater detail in FIG. 1, wherein the first level is used as a bearing surface for a distribution vehicle 106 and the second level is used to receive load carriers 104. What can be seen, however, are guide rails 112 forming the first level for guiding the movement of a distribution vehicle 106 in the direction 108, that is to say along the direction of extent of the guide rails 112.

Multiple load carriers 104, in the present case pallets, are disposed in the gangway shown in FIG. 1. The distribution vehicle 106 can be moved along the guide rails 112 beneath a pallet 104 by means of a corresponding movement in the direction 108, whereupon the pallet 104 can be lifted by the distribution vehicle in the direction 110 so as to then be moved within the gangway in the direction 108 by a movement of the distribution vehicle in the direction 108. It is thus possible for the pallets 104 with their piece goods (not visible in FIG. 1) to be moved into storage and removed from storage.

Frame struts 102 are also visible in FIG. 1, by means of which a stable overall assembly of the gangway storage system 100 is formed in conjunction with the guide rails 112. The frame struts 102 are connected to one another at cross beams 103 running transversely to the running direction 108. The guide rails 112 are fixed for example to the cross beams 103 by means of press-fit threaded bolts. Alternatively, angled profile "brackets" can be used, by means of which the guide rails 112 are fixed to the frame struts by means of press-fit bolts. On the whole, the cross beams and the frame struts form what is known as the "framework" of the gangway storage system.

Figure 2:
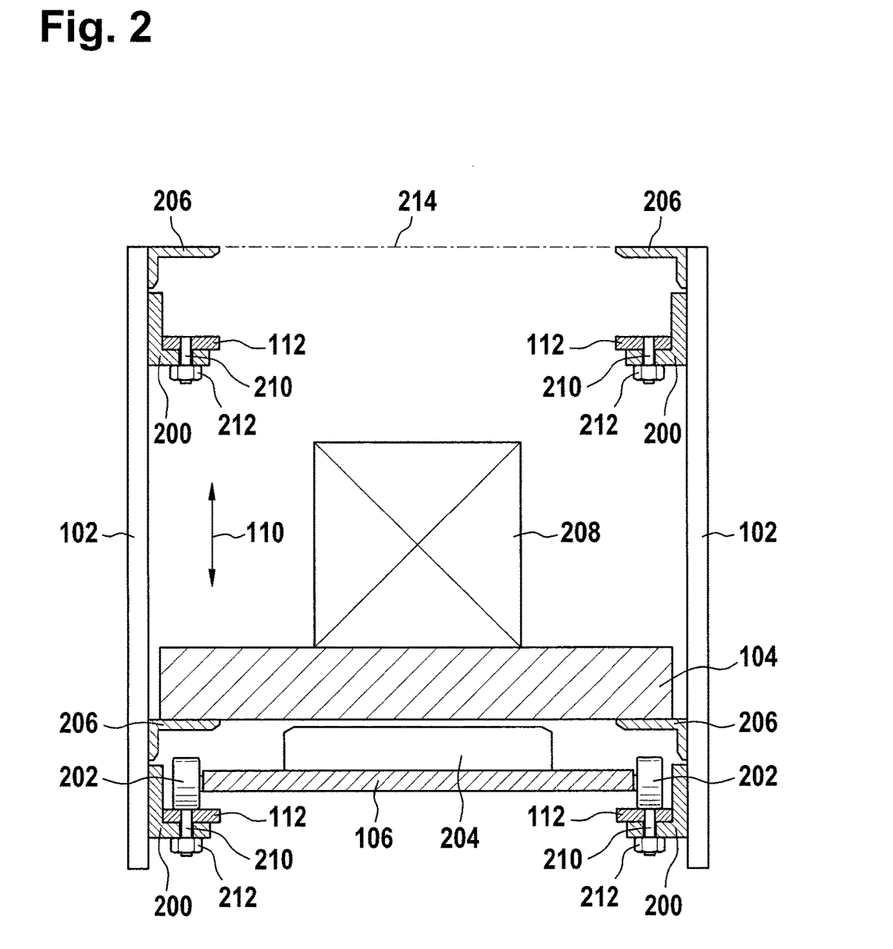
FIG. 2 shows a schematic cross-sectional view of a gangway of a shuttle warehouse.

FIG. 2 shows a cross-sectional view of the gangway storage system 100. Parts of the upright frame struts 102, to which brackets 200 are fixed, can again be clearly seen. These brackets 200 are used to receive and fix the guide rails 112. The guide rails 112 here define the bearing surface for the wheels 202 of the distribution vehicle 106.

FIG. 2 also shows brackets 206 which form a support surface for the pallets 104. The second level 214 is thus formed by the support surface.

In order to move a pallet 104, the distribution vehicle 106 is moved beneath the pallets 104 so as to then lift a pallet in the direction 110 by means of a mechanism 204 of the distribution vehicle, whereby the pallet 104 is lifted from the guide rail 112. The pallet 104 can be moved along the guide rails 112 together with the distribution vehicle 106 in order to then set down the pallet 104 again at a desired position.

The guide rails 112 are formed by segments arranged in succession in the longitudinal direction of the guide rails. These segments are fixed here to the framework of the gangway storage system via the brackets 200 by means of press-fit threaded bolts 210. The press-fit threaded bolts 210 are screwed to the framework via their thread by means of a corresponding nut 212.

Figure 3:
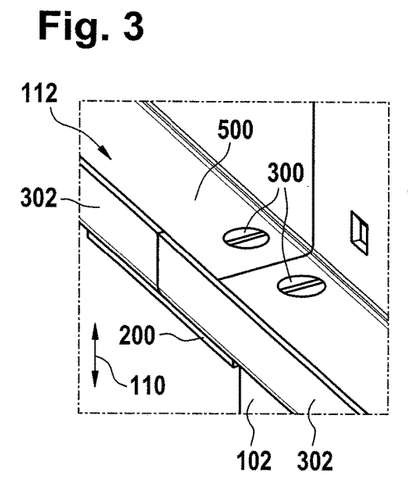
FIG. 3 shows a perspective view of two segments.
Figure 4:
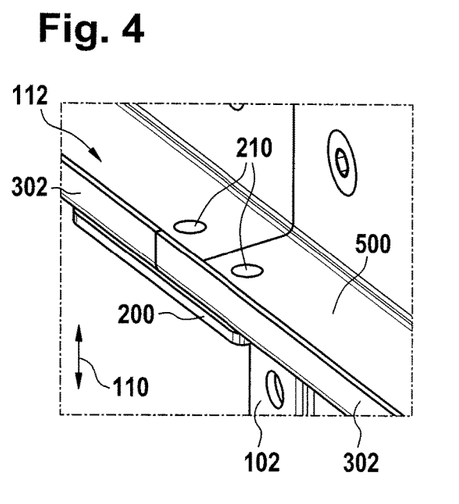
FIG. 4 shows a perspective view of two segments.

FIGS. 3 and 4 show perspective views of two segments 302 arranged directly adjacent to one another, which segments together form part of the guide rail 112. The segments 302 each rest on a bracket 200 and are fixed to the particular bracket by fastening means. In FIG. 3 the fixing is provided by means of a slotted-head screw 300, whereas in FIG. 4 the fixing is provided by means of a press-fit threaded bolt 210.

If, in FIG. 3, the wheels 202 of a distribution vehicle now travel over the heads of the slotted-head screws 300, this traversing of the slotted-head screws 300 can lead to a development of noise, since on the one hand the slots of the screws form an unevenness for the wheels 202 rolling over them and on the other hand the heads of the screws 300 are never completely flush with the bearing surface of the guide rails 112 on account of manufacturing tolerances. Here, the term "flush" means that the plane formed by the surface of the heads of the screws 300, as considered in the direction 110, is identical to the plane formed by the bearing surface of the guide rails 112.

By contrast, in the variant of FIG. 4, on account of the use of the press-fit threaded bolts 210, it is ensured that the upper face of the heads of the press-fit threaded bolts is flush with the bearing surface, i.e. the heads neither protrude into the path of the wheels 202 nor form an indentation with respect to the bearing surface. Since, in addition, the heads of the press-fit threaded bolts are contour-less, i.e. have no indentations or elevations, it is possible for the wheels 202 of the distribution vehicle 106 to roll over the fixing points formed by the press-fit threaded bolts 210 without resistance. A development of noise is avoided on account of the presence of these fixing points which are rolled over by the wheels of the distribution vehicle.

Figure 5:
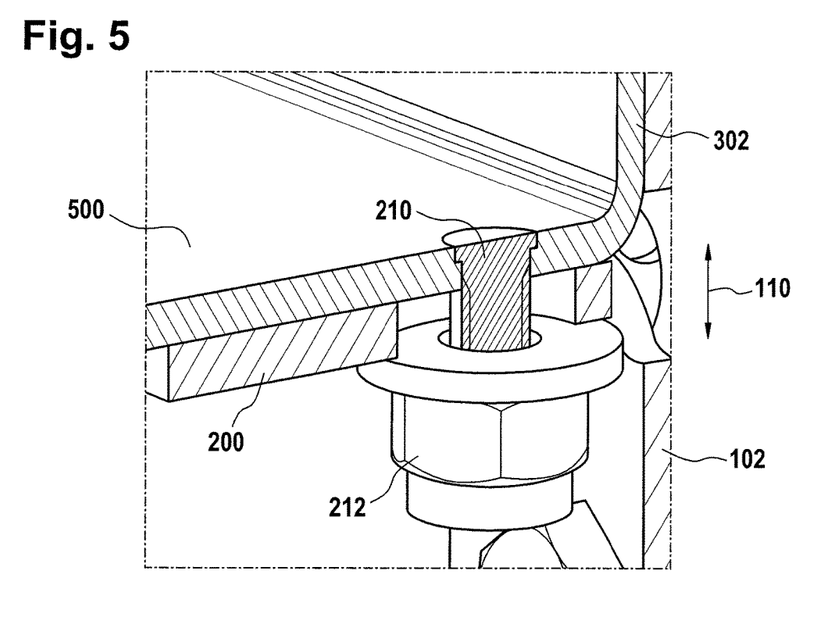
FIG. 5 shows a sectional view through a segment.

FIG. 5 shows a sectional view which, in cross-section, shows a segment 302 with its resultant bearing surface 500. The segment 302 is fixed to a rack strut 102 by means of the bracket 200. The segment 302 is fastened to the bracket 200 by means of a press-fit threaded bolt 210, wherein this is screwed to the bracket 200 by means of the nut 212.

Figure 6A:
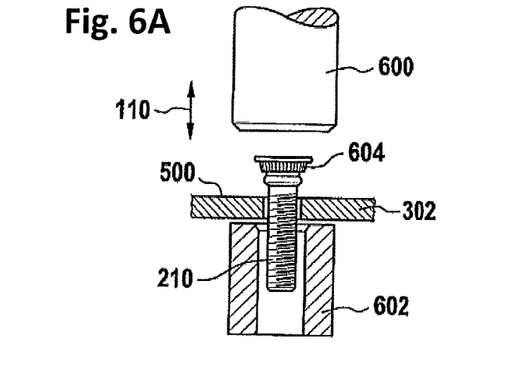
FIGS. 6A and 6B show steps of a method for pressing in a press-fit threaded bolt.
Figure 6B:
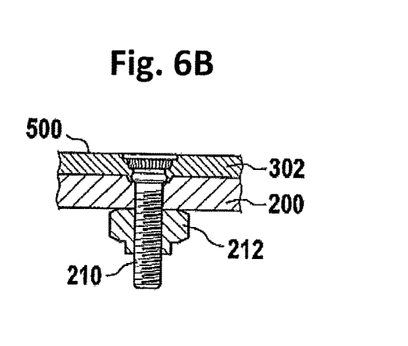

FIGS. 6A and 6B show various steps of a method for connecting a segment 302 to a bracket 200. Here, for the sake of simplicity, merely the segment 302 is shown in FIG. 6A, and the bracket 200 has been omitted from the drawing. In order to now introduced the press-fit threaded bolts 210 into the segment 302, a ram 600 is pressed from above onto the head 604 of the press-fit threaded bolt. The pressing area of the ram 600 is larger here than the area of the head 604. A support 602, which can be used optionally, serves to absorb the forces occurring during a pressing process so as to thus prevent for example a bending of the segment 302 in the direction 110.

Since the pressing area of the ram 600 is larger than the area of the head 604, the maximum path of movement of the ram 600 in the direction 110 is limited by the bearing surface 500, which is formed by the segments 302. It is thus automatically ensured that the surface of the head 604 is planar with the bearing surface 500. After the pressing process shown in FIG. 6A, the support 602 can be removed. As shown in FIG. 6B, the segment 302 can then be fixed to the bracket 200 by securing the press-fit threaded bolt 210 by means of a nut 212.

Figure 7:
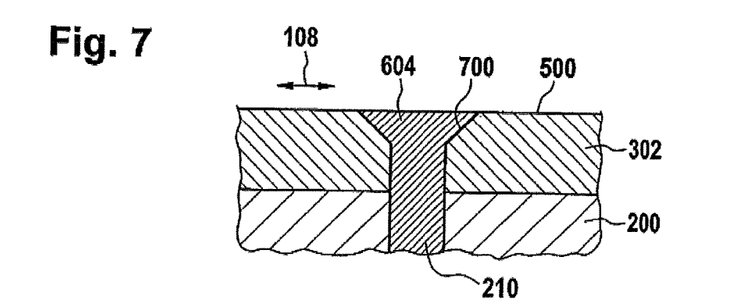
FIG. 7 shows a sectional view through a segment.

FIG. 7 shows a further cross-sectional view of a segment 302 with press-fit threaded bolt 210 received therein. Here, it can be seen that the head 604 of the press-fit threaded bolt 210 is received fully in a conical countersink 700 of the segment 302. The head 604 accordingly has a frusto-conical shape, which mates with the conical depression. Accordingly, the head 604 fits snugly against the walls of the countersink 700 of the segment 302 in the event of a pressing process, with no gaps at the transition between the segment 500 and the head 604 as considered in the running direction 108.

Figure 8:
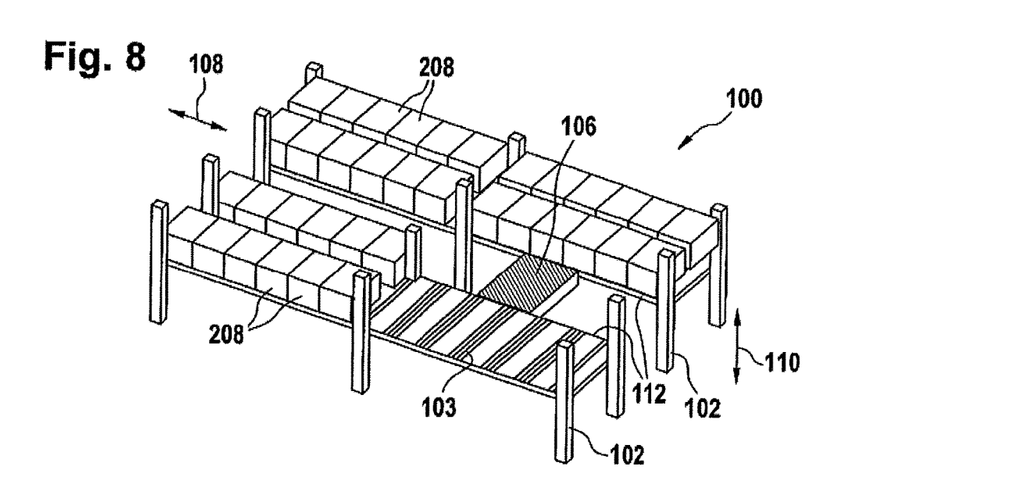
FIG. 8 shows a shuttle warehouse in which the load carriers are stored laterally to the left and right of the gangway.

FIG. 8 shows a shuttle warehouse 100, in which, in contrast to the shuttle warehouse 100 of FIG. 1, the load carriers 208 are not stored in the gangway in a manner arranged in succession (i.e. in the direction 108), but instead laterally to the left and right of the gangway (perpendicularly thereto). The distribution vehicle 106 can be moved on the guide rails 112 and is able to lift load carriers 208 on the left and right from the cross beams 103, move them onto the distribution vehicle, and then transport them on the distribution vehicle in the direction 108. That said with regard to FIGS. 1-7 applies analogously with regard to the embodiment of the bearing rails, in particular in respect of the fixing of their segments.

Figure 9:
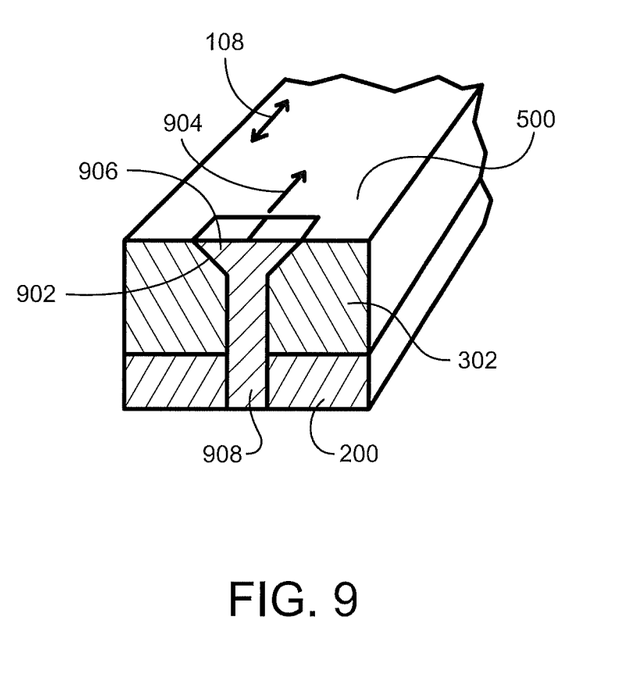
FIG. 9 shows a sectional view through a segment according to another embodiment of the invention.

FIG. 9 shows a further cross-sectional view of the segment 302 including a countersink 902 having a slot shape, according to an embodiment of the invention. As illustrated, a longitudinal axis 904 of the slot countersink 902 extends in the running direction 108. The slot countersink 902 is configured to receive a head 906 of a press-fit threaded bolt 908.

LIST OF REFERENCE SIGNS 100 shuttle warehouse
102 frame strut
103 cross beam
104 pallet
106 distribution vehicle
108 direction
110 direction
112 guide rail
200 bracket
202 wheel
204 lifting mechanism
206 bracket
208 piece good
210 press-fit threaded bolt
214 second level
300 screw
302 segment
500 bearing surface
600 ram
602 support
604 head
700 countersink

The invention claimed is:

1. A shuttle warehouse for storing load carriers, wherein the shuttle warehouse has a framework and a gangway, the framework has guide rails, wherein the guide rails are designed to guide the movement of a distribution vehicle, designed to physically move the load carriers, in the gangway on a bearing surface of the guide rails, wherein the guide rails are each formed by segments arranged in succession in the longitudinal direction of the guide rails, wherein the segments are fixed to the framework by press-fit threaded bolts, resulting in the upper face of the heads of the press-fit threaded bolts being received in the segments flush with the bearing surface and the press-fit threaded bolts being screwed to the framework by threading on the bolts.

2. The shuttle warehouse according to claim 1, wherein the heads of the press-fit threaded bolts are received completely in countersinks of the segments.

3. The shuttle warehouse according to claim 2, wherein the countersinks have a conical depression and the heads of the press-fit threaded bolts have a frusto-conical shape, which mates with the conical depression.

4. The shuttle warehouse according to claim 2, wherein the countersinks have a slot shape, wherein the longitudinal axis of the slot extends in the running direction of the guide rails, wherein the countersinks, as considered in a plane perpendicular to the running direction, have walls running at an incline, and the heads of the press-fit threaded bolts bear fully against the walls as considered in the plane.

5. The shuttle warehouse according to claim 1, wherein the press-fit threaded bolts are screwed to the framework in a frictionally engaged manner by nuts engaging in the thread.

6. The shuttle warehouse according to claim 1, wherein the surfaces of the heads are contour-less as considered in the plane parallel to the bearing surface.

7. The shuttle warehouse according to claim 1, wherein the bearing surface of the segments are arranged adjacently to the surfaces of the heads without gaps, as considered in the plane of the bearing surface.

8. The shuttle warehouse according to claim 1, wherein the segments have countersinks, and wherein the heads of the press-fit threaded bolts are press-fit into the countersinks.

\* \* \* \* \*